Aug. 7, 1934.  C. D. YAFFE  1,969,194
NUT CRACKER
Filed Aug. 14, 1933
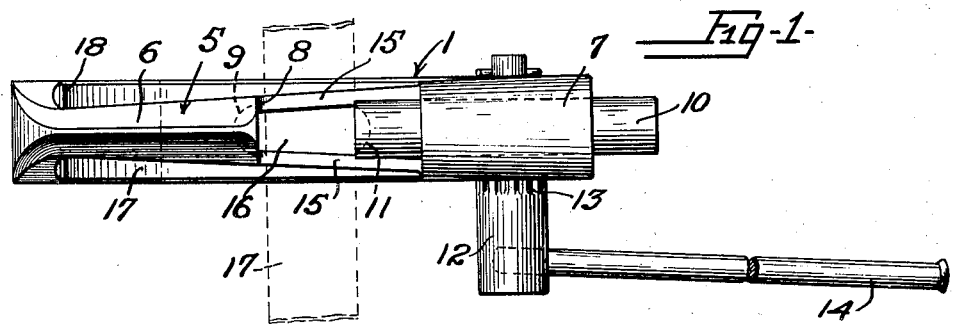
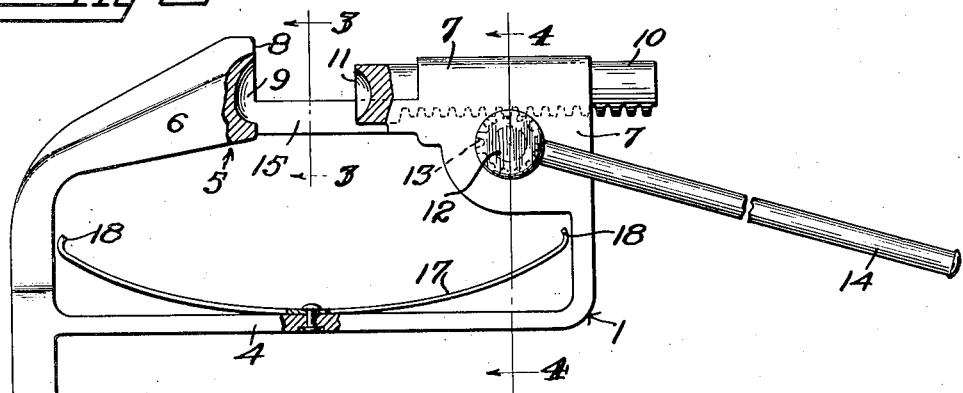
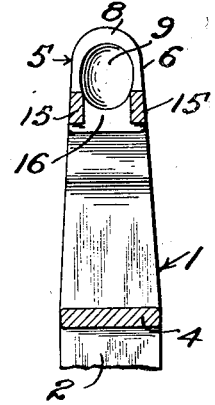
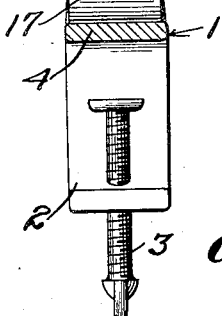
Charles D. Yaffe, INVENTOR
BY Victor J. Evans & Co.
ATTORNEY Patented Aug. 7, 1934

1,969,194

UNITED STATES PATENT OFFICE 1,969,194

NUT CRACKER

Charles D. Yaffe, El Paso, Tex.

Application August 14, 1933, Serial No. 685,088

2 Claims. (Cl. 146—16)

This invention relates to nut crackers and has for the primary object the provision of a device of the above stated character which will be simple, durable and compact and which may be manufactured and sold at a low cost.

Another object is the provision of an improved frame which besides carrying the jaws and the operating means therefor, is so constructed as to removably support a bowl or container directly under the jaws to receive the nuts and shell fragments as the nuts are cracked.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a nut cracker constructed in accordance with my invention.

Figure 2 is a side elevation, partly in section, illustrating the same.

Figure 3 is a transverse sectional view taken on the line 3—3 of Figure 2.

Figure 4 is a transverse sectional view taken on the line 4—4 of Figure 2.

Referring in detail to the drawing, the numeral 1 indicates a frame of substantially rectangular shape having formed integrally with one corner thereof a bracket arm 2 carrying a clamping bolt 3 adapted to cooperate with the wall 4 of the frame 1 in securing the latter to a table or like support. The wall 5 which is disposed opposite to the wall 4 has enlarged portions 6 and 7. The portion 6 is shaped to form a stationary jaw 8, the active face of which is socketed, as shown at 9. The portion 7 forms a combined gear casing and bearing to slidably support a rack bar 10 in horizontal alignment with the jaw 8 and one end of the rack bar is socketed to form a movable jaw 11. A shaft 12 is journaled in the portion 7 and a portion thereof is formed with teeth 13 meshing with the teeth of the rack bar 10. A handle 14 has one end fitted in a socket formed in the shaft whereby said shaft may be rotated in opposite directions to move the jaw 11 towards and from the jaw 8. The wall 5 of the frame 1, between the jaw 8 and the portion 7, is cutaway to form spaced members 15 with a slot 16 therebetween. The spaced members 15 are adapted to support a nut between the jaws and when the jaw 11 is advanced towards the jaw 8, the nut is cracked whereby on the movement of the jaw 11 away from the jaw 8 the cracked nut and shell fragments may fall through the slot 16.

An arcuately curved resilient member 17 is pivoted to the wall 4 of the frame 1 and has its free ends bent in hook-shape, as shown at 18. The member 17 with its ends 18 form an effective support for a bowl or like container so as to support the latter directly under the slot 16 to catch the cracked nuts and shell fragments. The member 17 to support the bowl or like container is moved at right angles to the wall 4 of the frame 1 and when not in use may be positioned to lie within the opening defined by the frame 1.

While I have shown and described the preferred embodiment of my invention, it will be understood that minor changes in construction, combination and arrangement of parts may be made without departing from the spirit and scope of my invention, as claimed.

Having described the invention, I claim:

1. A nut cracker comprising a skeleton frame, a clamp on said frame to secure the latter to a support, said frame having one side enlarged to provide a stationary jaw and a combined gear case and jaw supporting means, a rack bar slidable in the combined gear case and jaw supporting means, one end of said rack bar socketed to form a movable jaw of the rack bar, said stationary jaw having its active face socketed, a shaft journaled to the combined gear case and jaw supporting means, teeth on said shaft and meshing with the rack bar, a handle secured to said shaft, said frame between the jaws being cut away to form spaced nut supporting members and a slot therebetween and a container supported in the skeleton frame under said slot to receive nuts cracked by the jaws.

2. A nut cracker comprising a skeleton frame, a clamp on said frame to secure the latter to a support, said frame having one side enlarged to provide a stationary jaw and a combined gear case and jaw supporting means, a rack bar slidable in the combined gear case and jaw supporting means, one end of said rack bar socketed to form a movable jaw of the rack bar, said stationary jaw having its active face socketed, a shaft journaled to the combined gear case and jaw supporting means, teeth on said shaft and meshing with the rack bar, a handle secured to said shaft, said frame between the jaws being cut away to form spaced nut supporting members and a slot therebetween, and a resilient member pivoted to the frame to removably grip a container for supporting the latter under the slot.

CHARLES D. YAFFE.